United States Patent
Heiskanen et al.

(10) Patent No.: US 12,146,007 B2
(45) Date of Patent: Nov. 19, 2024

(54) MOULDABLE FIBROUS SHEET AND A PRODUCTION METHOD THEREOF

(71) Applicant: Stora Enso OYJ, Helsinki (FI)

(72) Inventors: Isto Heiskanen, Imatra (FI); Mari Hiltunen, Imatra (FI); Nina Ruohoniemi, Imatra (FI); Titta Lammi, Imatra (FI); Ville Ribu, Lappeenranta (FI); Tim Lindfors, Imatra (FI); Jari Räsänen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 649 days.

(21) Appl. No.: 17/299,986

(22) PCT Filed: Dec. 4, 2019

(86) PCT No.: PCT/IB2019/060419
§ 371 (c)(1),
(2) Date: Jun. 4, 2021

(87) PCT Pub. No.: WO2020/115667
PCT Pub. Date: Jun. 11, 2020

(65) Prior Publication Data
US 2022/0298264 A1    Sep. 22, 2022

(30) Foreign Application Priority Data
Dec. 5, 2018  (SE) .................... 1851514-8

(51) Int. Cl.
*C08B 1/00* (2006.01)
*B29C 64/118* (2017.01)
(Continued)

(52) U.S. Cl.
CPC ............ *C08B 1/003* (2013.01); *B29C 64/118* (2017.08); *B33Y 10/00* (2014.12); *B33Y 70/00* (2014.12);
(Continued)

(58) Field of Classification Search
CPC ........ D21H 11/18; D21H 15/04; D21H 17/28; D21H 27/10; D21J 5/00
See application file for complete search history.

(56) References Cited

U.S. PATENT DOCUMENTS

| 4,425,126 A | 1/1984 | Butterworth et al. |
| 5,443,902 A | 8/1995 | Knox et al. |

(Continued)

FOREIGN PATENT DOCUMENTS

| CN | 1608004 A | 4/2005 |
| CN | 1763313 A | 4/2006 |

(Continued)

OTHER PUBLICATIONS

China Technical Association of Paper Industry, China Science and Technology Press, Report on the Development of Pulp and Paper Science and Technology Discipline 2016-2017, pp. 41-42, Mar. 31, 2018.

(Continued)

*Primary Examiner* — Dennis R Cordray
(74) *Attorney, Agent, or Firm* — Greer, Burns & Crain, Ltd.

(57) ABSTRACT

The present invention relates to a web of fibrous cellulosic material derived from wood pulp, said web being suitable for three-dimensional moulding to form a packaging product, wherein the web comprises >40 wt % of soft wood chemical pulp and at least one strength enhancement agent, wherein the web has a grammage less than 400 g/m², and wherein the cellulose fibers of said soft wood chemical pulp comprise a fiber curl of >9%.

15 Claims, 3 Drawing Sheets

(51) Int. Cl.
   *B33Y 10/00* (2015.01)
   *B33Y 70/00* (2020.01)
   *B33Y 80/00* (2015.01)
   *C08B 30/10* (2006.01)
   *C08B 31/00* (2006.01)
   *B29K 1/00* (2006.01)

(52) U.S. Cl.
   CPC .............. *B33Y 80/00* (2014.12); *C08B 30/10* (2013.01); *C08B 31/00* (2013.01); *B29K 2001/00* (2013.01); *B29K 2003/00* (2013.01)

(56) References Cited

U.S. PATENT DOCUMENTS

| | | | |
|---|---|---|---|
| 2008/0193687 A1 | 8/2008 | Asayama et al. | |
| 2015/0114581 A1 | 4/2015 | Kinnunen et al. | |
| 2020/0063367 A1* | 2/2020 | Parker | B32B 1/00 |
| 2020/0063373 A1* | 2/2020 | Parker | D21J 1/08 |

FOREIGN PATENT DOCUMENTS

| | | |
|---|---|---|
| CN | 1942626 A | 4/2007 |
| EP | 1160379 A2 | 12/2001 |
| WO | 2008076056 A1 | 6/2008 |

OTHER PUBLICATIONS

Chinese Office Action for corresponding Chinese application No. CN201980087570 issued on Jun. 19, 2023.
Zhou Sukun et al., Preparation and Applications of Microfibrillated Cellulose, Progress in Chemistry, 2014, 26(10), 1752-1762. (Abstract only is translated.).
Jinbao Li et al., Progress on Preparation and Application of Microfibrillated Cellulose, Paper Science & Technology, vol. 34, No. 3, 2015.
Zhan Zheng-feng et al., The Research of Microfibrillated Cellulose and Its Application in Paper Industry, A Review, China Pulp and Paper, vol. 36, No. 7, 2017.
Xiling Zeng et al., Fibre deformations induced by different mechanical treatments and their effect on zero-span strength, Nordic Pulp and Paper Research Journal, vol. 27, No. Feb. 2012.
Xiling Zeng et al., The Elongation Potential of Paper—How Should Fibres be Deformed to Make Paper Extensible?, BioResources 8(1), 472-486.
Chinese Office Action for corresponding Chinese application No. CN201980087570 issued on Aug. 2, 2022.
Extended European Search report from corresponding European application No. 19893538.9 dated Aug. 10, 2022.
International Search Report from corresponding PCT application No. PCT/IB2019/060419 mailed on Feb. 21, 2020.
Zeng, Xiling, et al, Fibre deformations induced by different mechanical treatments and their effect on zero-span strength, Nordic Pulp and Paper Research Journal, vol. 27, No. Feb. 2012.
Zeng, Xiling et al, The Elongation Potential of Paper—How Should Fibres be Deformed to Make Paper Extensible?, BioResources 8(1), 472-486, 2013.
Vishtal, Alexey et al., Deep-Drawing of Paper and Paperboard: The Role Of Material Properties, BioResources 7(3), 4424-4450, 2012.

\* cited by examiner

MOULDABLE FIBROUS SHEET AND A PRODUCTION METHOD THEREOF

This application is a U.S. National Phase under 35 U.S.C. § 371 of International Application No. PCT/IB2019/060419, filed Dec. 4, 2019, which claims priority under 35 U.S.C. §§ 119 and 365 to Swedish Application No. 1851514-8, filed Dec. 5, 2018.

TECHNICAL FIELD

The present invention relates to a web of fibrous cellulosic material derived from wood pulp, where said web is suitable for three-dimensional moulding to form a packaging product.

BACKGROUND

There is a growing interest for producing cellulose based, three-dimensional (3D) products, e.g. for use as packaging applications. One way of making such products is by deep-draw forming a fibrous web or sheet, i.e. whereby a sheet material is radially drawn by vacuum into a forming die to a specific shape. However, the 3D formability of fiber-based webs is limited due to poor stretch to break and elongation properties. As an example, 3D-forming of tray from standard multiply board is limited when using conventional tools and systems. Different solutions have been proposed for improving the 3D-formability of fibrous webs or sheets, such as the use of synthetic additives, synthetic fibers etc, but there is still a need for better solutions for providing a way of producing a variety of 3D shaped cellulose based packages and products.

OBJECTS OF THE INVENTION

It is an object of the present invention, to provide a web of fibrous cellulosic material derived from wood pulp, said web being suitable for three-dimensional molding into fiber-based products, e.g. by means of a deep drawing sheet forming process.

SUMMARY

According to the invention, there is provided a web of fibrous cellulosic material derived from wood pulp, said web being suitable for three-dimensional moulding to form a packaging product, wherein the web comprises >40 wt % of soft wood chemical pulp and at least one strength enhancement agent, wherein the web has a grammage less than 400 g/m$^2$, and wherein the cellulose fibers of said softwood chemical pulp comprise a fiber curl of >9%.

Using fibers with high fiber curl, such as a fiber curl >9% increases the stretch of the web of the fibrous cellulosic material. This stretch is useful in three-dimensional moulding (also referred to herein as three-dimensional forming). However, although higher fiber curl is typically better for three-dimensional moulding, too high fiber curl can lead to problems with high flocculation. Therefore, in some embodiments, the fiber curl of the cellulose fibers of the softwood chemical pulp should be kept below 15%. For example, the fiber curl of the cellulose fibers of the softwood chemical pulp may be between 9-15%.

A pulp suspension with a portion of curled fibers can for example be obtained by high consistency refining (HCR) or flash drying of a softwood chemical pulp. The present invention is based on the realization that although a high degree of fiber curl can be achieved in a pulp suspension, it is very difficult to maintain this high degree of fiber curl during the further chemical and/or mechanical processing steps required for forming the pulp suspension into a web. Further treatment (e.g. LC-refining, deflaking, mixing, etc.) of the curly fibers to improve the bonding properties or other properties of the pulp or fibers will lead to a straightening of the fibers, which is not desired when the end-product is for 3D forming. The degree of fiber curl of the cellulose fibers in the finished web will therefore typically be significantly lower than the degree of fiber curl of the cellulose fibers in the pulp suspension.

The present inventors realized that if it would be possible to retain the high degree of fiber curl from the pulp suspension also in the finished web, the elongation properties of the web could be improved.

The inventors have found that in order to get acceptable bonding without straightening the fibers, a relatively large amount of a strength enhancement agent may be used. The strength enhancement agent, e.g. a natural binder in the form of starch, is added to the softwood chemical pulp at an amount which is much higher than the amounts normally contemplated when a strength enhancement agent is used in paper/board production.

Thus, in preferred embodiments the web comprises a strength enhancement agent. The amount of the strength enhancement agent in the web is preferably higher than the amounts normally used when a strength enhancement agent is used in paper/board production.

The strength enhancement agent may for example be a synthetic or natural polymer. Examples of synthetic polymers, or synthetic binder agents, useful as strength enhancement agents include, but are not limited to, polyacrylamide and derivatives thereof. Examples of natural polymers, or natural binder agents, useful as strength enhancement agents include, but are not limited to, starch and derivatives thereof.

A preferred strength enhancement agent is a natural binder in the form of starch. The inventors found that by adding a high amount of starch to the pulp suspension, straightening of the curly fibers during processing can be avoided. The amounts of starch added are preferably in the range of 5-75 kg/tn and more preferably in the range of 10-75 kg/tn or in the range of 12-75 kg/tn. These amounts are much higher than the amounts of starch normally contemplated when starch is used in paper/board production.

The addition of this high amount of a strength enhancement agent, e.g. starch, to the pulp suspension allows for higher degree of fiber curl from the pulp suspension to be retained also in the finished web, and as a result the elongation properties of the web are improved.

In some cases, depending on the type and composition of the pulp, an amount of microfibrillated cellulose (MFC) may also be added to the pulp suspension in order to increase the strength enhancement agent loading capacity of the pulp.

One possible strength enhancement agent is starch. According to a further aspect of the invention, said web comprises at least one natural binder agent in the form of starch, at an amount of between 5-75 kg/tn, more preferably 10-75 kg/tn or 12-75 kg/tn. The web may for example comprise the at least one natural binder agent in the form of starch, at an amount of between 10-70 kg/tn, 10-60 kg/tn, 10-50 kg/tn or 7-30 kg/tn. Preferably, the web comprises the at least one natural binder agent in the form of starch, at an amount of between 10-50 kg/tn. Said natural binder agent may be selected from the group comprising: native starch, cooked starch, cationic starch, native chemically modified starch, physically modified polymer grafted starch, enzyme modified starch, anionic starch, amphoteric starch, cross-linked starch, pre-gelled starch and swelled starch. According to a preferred aspect of the invention the starch is pre-gelled starch or swelled starch. A pre-swelled or swelled or pre-gelled starch means that uncooked starch granules are either swelled in a solvent or e.g. in NaoH such that the particle dimension e.g. diameter is at least 5% great or preferably more than 10%. Swelling of starch granules can be identified from optical microscope images. A completely cooked or dissolved starch granules cannnot be seen in a regular optical microscope since the particle boundaries and/or the particle crystallinity are changed.

According to one aspect of the invention, the web comprises 0.3-10% by weight of microfibrillated cellulose, preferably 0.3-5 wt % based on the total fiber weight of the web. The addition of microfibrillated cellulose increases the strength enhancement agent loading capacity of the pulp. This allows for higher amounts of the strength enhancement agent, such as starch, to be added and bound to the pulp than would otherwise have been possible.

In some embodiments, the web comprises both at least one natural binder agent in the form of starch at an amount of between 5-75 kg/tn, more preferably 10-75 kg/tn or 12-75 kg/tn, and 0.3-10% by weight of microfibrillated cellulose.

According to one aspect of the invention, the web comprises >50 wt %, >60 wt %, >70 wt %, >80 wt % or >90 wt %, of the soft wood chemical pulp wherein the cellulose fibers of said softwood chemical pulp comprise a fiber curl of >9%. The remaining composition of the web may for example be made up of cellulose fibers having a fiber curl of 9 or less, or of other additives, or a combination thereof.

According to one aspect of the invention, the web comprises a grammage less than 300, preferably less than 220 g/m².

In order to be suitable for three-dimensional moulding to form a packaging product, the web preferably has a grammage of above 80 g/m², preferably above 100 g/m². Thus, the web may for example have a grammage between 80 and 400 g/m² or between 100 and 300 g/m².

According to another aspect of the invention, the web comprises a density between 600-875 kg/m³.

It has surprisingly been found that use of wood pulp suspension containing curled fibers leads to a special type of internal structure when forming a web material, in its turn leading to improved moulding properties and enables for the production of more advanced 3D-shapes upon deep-draw forming of the material. Thanks to the invention, it is possible to produce three-dimensional fiber-based packages e.g. for food content, where possible use may include: chilled processed seafood or meat, chilled meat substitutes, hard cheese and/or box assortments.

The "web of fibrous cellulosic material" described herein is also referred to as "fibrous sheet material".

The curled fibers according to the invention may be non-woven curled fibers.

According to another aspect of the invention, said web has been subjected to hydrofobic sizing. Hereby, the web material's tendency to absorb liquid is reduced, which is an advantage if the three-dimensional end product is to be used for containing food stuff. Hydrophobic sizing agents can be rosin, AKD, ASA sizing or a combination thereof. Other sizing agents known in the art are also conceivable.

According to one aspect of the invention, the geometrical mean tensile strength index of of the fibrous sheet material is >50 Nm/g. Tensile index is tensile strength in N/m divided by grammage and denotes the maximum tensile force developed in a test specimen before rupture on a tensile test according to standard procedure at 23° C. at 50% RH.

According to another aspect of the invention, said fibrous sheet material comprises a geometrical stretch of >4%. Stretch refers to percentage elongation of a material before rupture. Preferably, the web of fibrous sheet material has a geometrical mean stretch, referring to the percentage elongation of the web before rupture, of >4% as measured by means of standard tensile test ISO 1924-2 with a span length of 20 mm and a test speed of 2 mm/minute.

According to another aspect of the invention, said fibrous sheet material comprises a stretch in cross direction (CD) of >6%, preferably >7%, and more preferably >8%. Preferably, the web of fibrous sheet material comprises a stretch, referring to the percentage elongation of the web before rupture, in the cross direction (CD), of >6.5%, preferably >7.5%, and more preferably >8.5% as measured by means of standard tensile test ISO 1924-2 with a span length of 20 mm and a test speed of 2 mm/minute.

According to yet another aspect, the invention relates to a multiply laminate material comprising at least two layers whereof one layer is a fibrous sheet material as previously described. The layers can be produced separately and then glued together to form said multiply laminate material.

According to another aspect of the invention, said multiply laminate material comprises several layers of said fibrous sheet material as previously described, glued together to form an integrated laminate structure.

According to yet another aspect, said multiply laminate material comprises at least one barrier layer, such as a polymer film layer forming a barrier against liquid, gas, aroma, or grease, oil and/or fat. The barrier layer may comprise polymers such as polyolefins, polylactic acid, polyesters, biopolymers, starch-based polymers, dispersion polymers, plastomers, elastomers, ethylene vinyl alcohol and co-polymers or blends thereof. Such barrier layer may be extruded or laminated onto the fibrous sheet material according to the invention, or to any other layer of a multiply laminate containing one layer of the fibrous sheet material.

The present invention also relates to a method for producing a molded, three-dimensional fiber-based product, comprising at least the steps of:
  providing a fibrous sheet material according to the invention;
  providing a forming tool with at least one three-dimensional mold;
  using the forming tool for forming a three-dimensional product out of the fiber-based web. Said forming may be any one of vacuum forming (e.g. deep draw), thermoforming, cold forming, pressing or hydroforming.

Thanks to the special internal structure of the web material of the invention, improved molding of said sheet into 3D-products can be achieved. By "improved molding" herein means to 3D form articles and products out of a fibrous sheet by means of a mold, where the resulting end product is void of cracks and/or ruptures. For instance, thanks to the present invention it is possible to form a three-dimensional fiber-based product (e.g. a tray or container) with a depth of between 3-5 cm, preferably >4 cm, without any cracks in the material.

The present invention also relates to a three-dimensional fiber-based product obtainable by means of a 3D-forming method according to the invention. According to one aspect, the three-dimensional, fiber-based product according to the invention comprises a laminate with multiple layers whereof at least one layer is made of the fibrous sheet material according to the invention.

The present invention also relates to the use of a web of fibrous cellulosic material comprising cellulose fibers having a fiber curl of >9%, for three-dimensional forming of a packaging product.

DESCRIPTION OF EMBODIMENTS

The present description is directed to a a web of fibrous cellulosic material (i.e. sheet material) derived from wood pulp, said material having properties which makes it suitable for 3D forming fiber-based products, such as trays, food packages and/or containers. The description is also directed to the 3D forming of said sheet material into said fiber-based products.

The present invention is based on the insight that use of pulp containing curled cellulose fibers, leads to improvements upon three-dimensional forming a sheet material made from said pulp. The curled fibers that are present in pulp gives strong network and flocculation when forming a sheet, leading in its turn to improved moldability of the resulting dried sheet material. According to the invention, the cellulose fibers of the dried sheet material comprises a fiber curl that is higher than 9%. The fiber curl of the dried sheet material is determined by means of re-pulping or disintegrating a portion of the sheet, and thereafter measure the fiber curl by standard methods, such as in a Valmet FS5 image analyzer. Disintegration of the sheet into pulp can be done by standard methods, such as by the procedure specified by ISO 5263 describing laboratory wet disintegration.

One way of obtaining a pulp suspension with a portion of curled fibers is high consistency refining (HCR). This is a well-known technique for making fibrillated thermomechanical pulp (TMP). "High consistency" refers to a discharge consistency of a refined pulp suspension that is higher than 20 wt %. Due to high transfer of stresses between the fibers at HCR, microcompressions are imparted leading to that curled and kinked fibers are created. Curly fibers produce high flocculation, and 3D flocks have relatively high strength and flock stretchability compared to stiff non-curly fibers due to mechanical interlocking.

Figure 1:
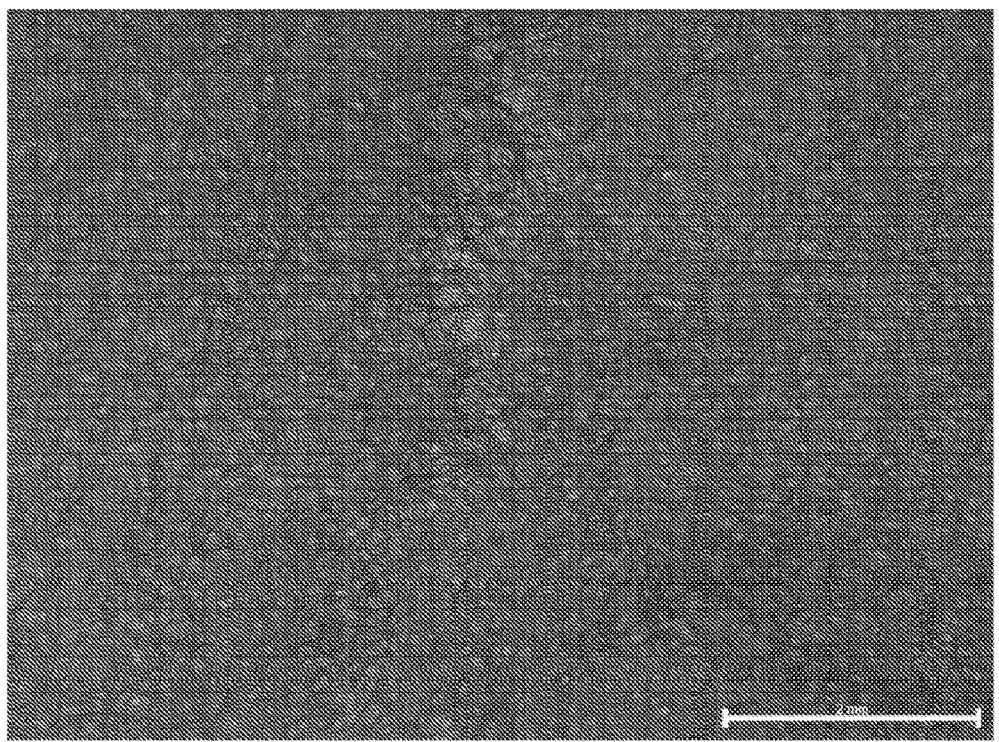
FIG. 1 shows a micrograph of a web material made from the suspension according to the invention.
Figure 2:
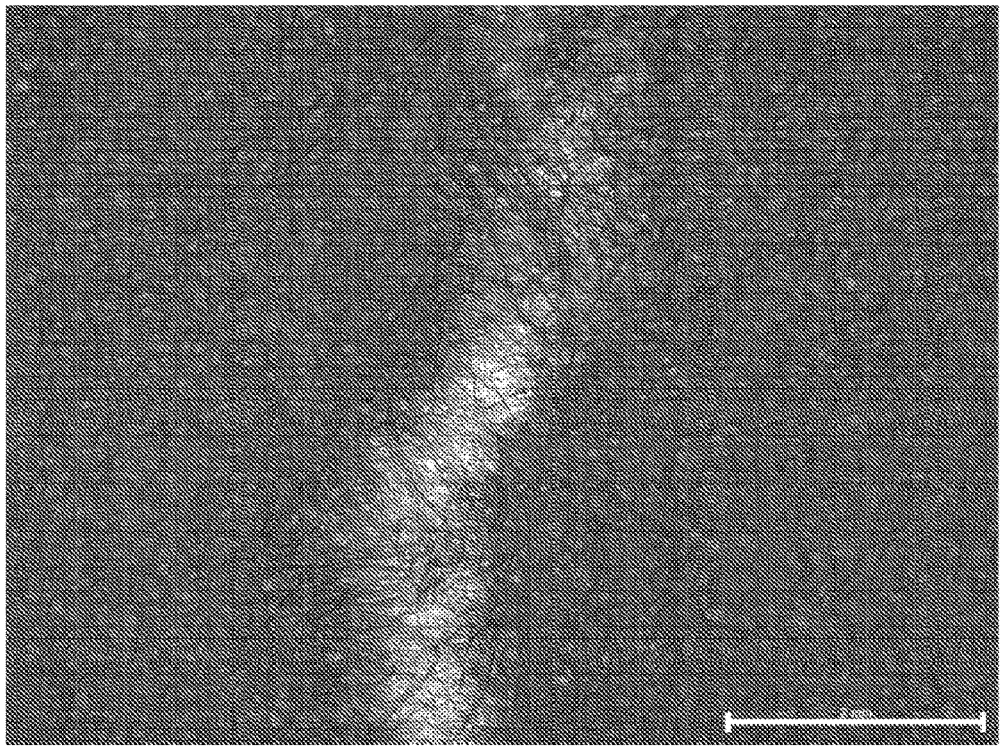
FIG. 2 shows a micrograph of a web material which has been stretched apart.
Figure 3:
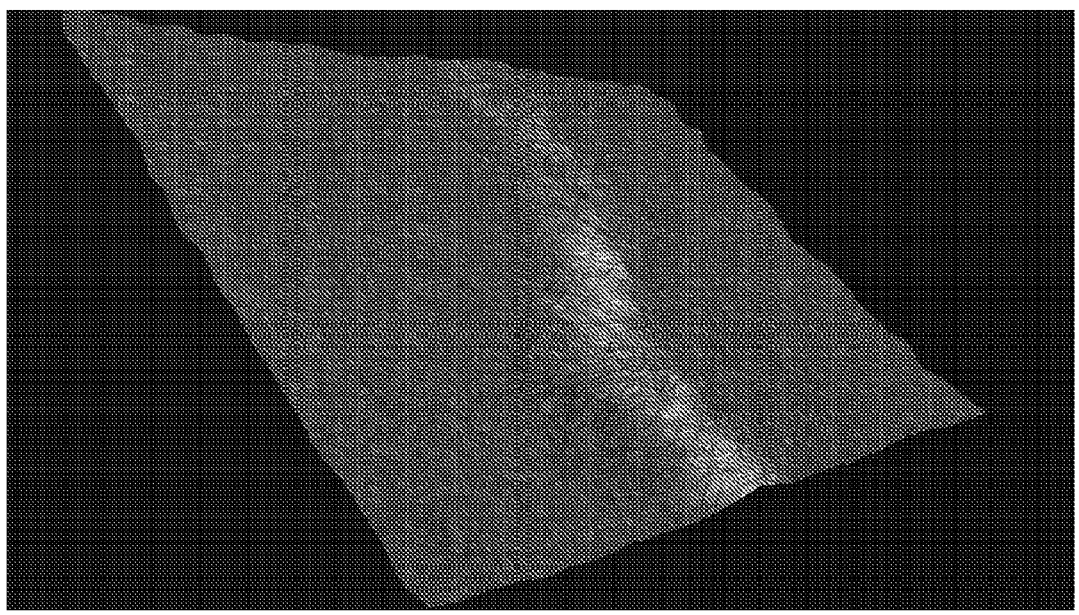
FIG. 3 shows a perspective view of the web material in FIG. 2.

FIG. 1 shows a micrograph of a dried fiber-based sheet material according to the invention, having a curl higher than 9%. FIGS. 2 and 3 show an example of the same material as in FIG. 1, which has been subjected to stretch to cause a rupture. It is seen in FIG. 2 that the curled fibers in the web material are oriented such that they overlap the ruptured portion, thus withholding the material and leading to a material with improved tolerance to tensions—i.e. a material with increased stretch.

Figure 4:
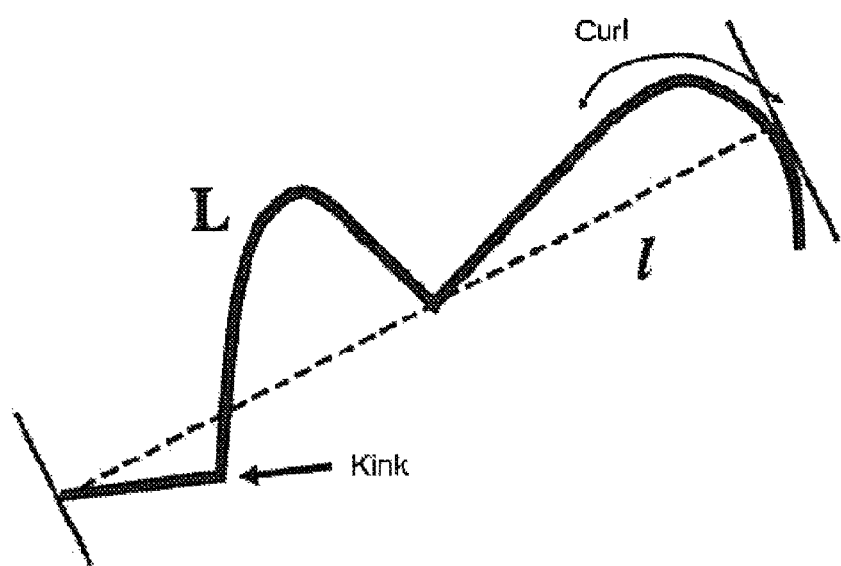
FIG. 4 illustrates kink and curl of a cellulose fiber.

The skilled person understands that "curled" is referring to curved cellulose fiber and "kink" is referring to sharp changes in an axial direction of a cellulose fiber. The curl % is measured by means of a fiber image analyzing instrument, such as Valmet FS5, and is determined by measuring individual fiber contours and projected lengths. FIG. 4 shows an illustration of fibre curl and fibre kink. Curl % is based on length-weighed curl of cellulose fibers and is calculated as 100%*(I/L) where I is the fiber contour length and L is the projected end-to-end distance of the fiber, i.e. the distance between the two points on the fibre that are furthest apart.

According to one embodiment of the invention, microfibrillated cellulose (MFC) is added to the pulp suspension to form a mixture which is then used for producing the web of fibrous cellulosic material in a traditional paper-making process (e.g. wherein pulp is fed to a paper machine where it is formed as a paper web and the water is removed from it by pressing or drying). MFC may for instance be added before, during or after a step of HC refining. The microfibrillated cellulose is preferably microfibrillated cellulose produced from mechanical, thermomechanical or chemical pulp, preferably produced from Kraft pulp. The microfibrillated cellulose preferably has a Schopper Riegler value (SR°) of more than 80. According to another embodiment the MFC may have a Schopper Riegler value (SR°) of more than 93. According to yet another embodiment the MFC may have a Schopper Riegler value (SR°) of more than 85. The Schopper-Riegler value can be obtained through the standard method defined in EN ISO 5267-1. This high SR value is determined for a pulp, with or without additional chemicals, thus the fibers have not consolidated into a film or started e.g. hornification. The SR value specified herein, is to be understood as an indication but not a limitation, to reflect the characteristics of the MFC material itself.

A natural binder agent is preferably added to the pulp suspension intended to be used for producing the web, said natural binder agent preferably being in the form of native, cooked or swelled cationic starch. Swelling of the starch can be done by cross-linking starch, swelling in a solvent or party cooking.

The fibrous sheet material according to the invention is preferably used for 3D-forming a product intended for containing foodstuff. Such product may comprise multiply layers in addition to said fibrous sheet material. For example, the product may comprise a barrier layer intended to be in contact with the foodstuff when the product is in use, where such barrier layer may be e.g. a polymer barrier layer. Such polymer layer can be applied as a coating onto the fibrous sheet material, or extruded in an extrusion process or laminated as a film resulting in a multilayer board which then can be subjected to 3D forming into a product. It is also conceivable that the barrier layer is applied onto the product during the 3D-forming step, in which case a polymer film may be put into contact with the product and adhered thereto by means of a combination of vacuum and heat.

EXAMPLE

A pulp suspension was prepared by means of HC refining cellulose fibers from Scotts pine at a consistency of 20 wt %. A reference sample, corresponding to sample number 1 in Table 1, was prepared by means of LC refining cellulose fibers from Scotts pine at a consistency of 3.5 wt %.

The HC refined pulp suspension was used to prepare four samples, corresponding to samples number 2-5 in Table 1. Natural binder in the form of swollen starch was added to samples 2, 4 and 5. The starch was prepared by swelling by cooking for 3 min starting from temperature 75° C. (max 85° C.) whereafter it was cooled by dilution with cold water to consistency of 2%.

Each of the samples 1-5 was used for preparing a dried fibrous sheet material with a grammage of 150 g/m2.

Each of the sheet materials (samples 1-5) was tested with regards to geometrical tensile index, geometrical stretch, stretch in cross direction (CD) and fiber curl %.

Each sheet material was also subjected to three-dimensional forming by means of thermoforming with Variovac Primus thermoforming-line using constant pre-heating and heating temperatures, both at 90° C. The heating time and forming time were varied between 0.5 s and 2 s. The forming was done with vacuum assist. The forming pressure was varied between 0.4 and 1 bar. A mould depth of 20 mm with optimised mould geometry was used. Three packages in one forming cycle (3.1 forming) were formed.

Moisture content of the sheets were between 5.4 and 7.3% (samples were pre-conditioned).

Even if vacuum can be applied, good results might also be obtained only with temperature and pressure. Forming can further be made with or without corona pretreatment. After molding, the packaging can be filled after which a lid is sealed on the packaging.

The stretch was measured by means of a standard tensile test (ISO 1924-2 with a span length of 20 mm), wherein the sheet to be tested was stretched with test speed of 2 mm/minute until a point where it ruptured. The stretch then corresponds to the percent elongation when rupturing, i.e. to what extent in % the sheet material deforms without breaking upon being subjected to stretching.

In Table 1, convertability result "poor" means that the 3D-formed product had visible, open cracks in the material; "moderate" means that the 3D-formed product had small but visible cracks; and "good" means that no cracks were visible in the material of the product.

TABLE 1

| Property | Unit | 1 | 2 | 3 | 4 | 5 |
|---|---|---|---|---|---|---|
| Refining Pulp | | LC Pine | HC Pine | HC Pine | HC Pine | HC Pine |
| Starch | kg/tn | 0 | 15 | 0 | 15 | 30 |
| SR level | | 30 | 30 | 40 | 40 | 40 |
| Sheet properties | | | | | | |
| Grammage | g/m2 | 150 | 150 | 150 | 150 | 150 |
| Geom tens index | Nm/g | 59.1 | 57.1 | 45.7 | 52.7 | 57.1 |
| Geom stretch | % | 3.8 | 6 | 5.4 | 5.7 | 6.2 |
| Stretch CD | % | 5.7 | 9.6 | 9 | 9.2 | 9.9 |
| Fiber curl FS5 | % | 8.7 | 12.5 | 13.3 | 12.7 | 12.4 |
| Convertability test | | | | | | |
| Vacuum forming | | Poor | Moderate | Moderate | Moderate | Good |

Results

It can be seen in Table 1 that HC refining provides higher curl % compared to LC refined treatment, and further that samples 2-5 have higher geometrical stretch as well as higher stretch in CD compared to sample 1. In line herewith, the convertability test also showed that the 3D formability of all samples 2-5 are better than for sample 1. Sample 1, prepared with LC refining has good tensile strength, but low fiber curl resulting in low stretch. Sample 3, prepared with HC refining but no starch has good stretch, but poor tensile strength. The samples 2, 4 and 5 prepared in accordance with the invention using a strength enhancement agent in the form of starch exhibit both good tensile strength and but high fiber curl resulting in high stretch.

The invention claimed is:

1. A web of fibrous cellulosic material derived from wood pulp, said web being suitable for three-dimensional moulding to form a packaging product, wherein the web comprises:
   >40 wt % of soft wood chemical pulp comprising cellulose fibers, and
   at least one strength enhancement agent,
   wherein the web has a grammage less than 400 g/m², and
   wherein the cellulose fibers of said soft wood chemical pulp comprises a fiber curl of >9%,
   wherein said strength enhancement agent comprises a natural binder agent in the form of a starch, at an amount of 10-75 kg/tn.

2. The web according to claim 1, wherein the web comprises a density between 600-875 kg/m³.

3. The web according to claim 1, further comprising:
   between 0.3-10% by weight of microfibrillated cellulose, based on a total fiber weight of the web.

4. The web according to claim 1, wherein said starch is selected from a group consisting of: native starch, cooked starch, cationic starch, native chemically modified starch, physically modified polymer grafted starch, enzyme modified starch, anionic starch, amphoteric starch, crosslinked starch, pre-gelled starch, and swelled starch.

5. The web according to claim 1, wherein said web has been subjected to hydrophobic sizing.

6. The web according to claim 1, wherein the web comprises a geometrical mean tensile strength index of >50 Nm/g.

7. The web according to claim 1, wherein the web comprises a geometrical mean stretch, referring to a percentage elongation of the web before rupture, of >4% as measured by standard tensile test ISO 1924-2 with a span length of 20 mm and a test speed of 2 mm/minute.

8. The web according to claim 1, wherein the web comprises a stretch, referring to a percentage elongation of the web before rupture, in the cross direction (CD), of >6.5% as measured by standard tensile test ISO 1924-2 with a span length of 20 mm and a test speed of 2 mm/minute.

9. A multiply laminate material comprising:
   at least two layers,
   wherein one layer of the least two layers is a web according to claim 1.

10. The multiply laminate material according to claim 9, further comprising:
    at least one barrier layer forming a barrier against liquid, gas, aroma, or grease, oil and/or fat.

11. A method for producing a molded, three-dimensional fiber-based product, comprising at least the steps of:
    providing a fibrous cellulosic web material according to claim 1;
    providing a forming tool with at least one three-dimensional mold; and
    using the forming tool for forming a three-dimensional product out of the fiber-based material.

12. The method according to claim 11, wherein said forming is selected from a group consisting of: vacuum forming, thermoforming, cold forming, pressing, or hydroforming.

13. A three-dimensional, fiber-based product obtained by the method according to claim 11.

14. A three-dimensional, fiber-based product comprising: a laminate with multiple layers,
    whereof at least one layer of said multiple layers is made of the web of fibrous cellulosic material according to claim 1.

15. The web according to claim 1, wherein the web comprises a three-dimensional packaging product.

\* \* \* \* \*